(12) United States Patent
Bing et al.

(10) Patent No.: US 10,017,896 B2
(45) Date of Patent: Jul. 10, 2018

(54) CONTROL PANEL FOR CLOTHES DRYER AND CLOTHES DRYER

(71) Applicant: QINGDAO JIAONAN HAIER WASHING MACHINE CO., LTD., Qingdao, Shandong (CN)

(72) Inventors: Jindong Bing, Qingdao (CN); Rongfeng Cheng, Qingdao (CN); Jian Wang, Qingdao (CN); Luhua Yan, Qingdao (CN); Xianchang Li, Qingdao (CN); Haifei Liu, Qingdao (CN)

(73) Assignee: QINGDAO JIAONAN HAIER WASHING MACHINE CO., Shandong (CN)

(*) Notice: Subject to any disclaimer, the term of this patent is extended or adjusted under 35 U.S.C. 154(b) by 0 days.

(21) Appl. No.: 15/515,575

(22) PCT Filed: Nov. 17, 2014

(86) PCT No.: PCT/CN2014/091304
§ 371 (c)(1),
(2) Date: Mar. 29, 2017

(87) PCT Pub. No.: WO2016/049969
PCT Pub. Date: Apr. 7, 2016

(65) Prior Publication Data
US 2017/0292219 A1    Oct. 12, 2017

(30) Foreign Application Priority Data
Sep. 29, 2014 (CN) .......................... 2014 1 0512415

(51) Int. Cl.
*D06F 58/28* (2006.01)
*H05K 5/00* (2006.01)
(Continued)

(52) U.S. Cl.
CPC ............. *D06F 58/28* (2013.01); *H01F 1/057* (2013.01); *H01F 1/10* (2013.01); *H05K 5/0017* (2013.01)

(58) Field of Classification Search
None
See application file for complete search history.

(56) References Cited

U.S. PATENT DOCUMENTS 8,317,275 B2 * 11/2012 Han ........................ D06F 39/12
312/228
8,434,243 B2 * 5/2013 Kim ...................... D06F 39/005
34/606
(Continued)

FOREIGN PATENT DOCUMENTS

CN    101168922    4/2008
CN    204199064    3/2015

OTHER PUBLICATIONS

International Application No. PCT/CN2014/091304, International Search Report, dated Jul. 1, 2015.

*Primary Examiner* — Xanthia C Cunningham
(74) *Attorney, Agent, or Firm* — Greenberg Traurig, LLP (57) ABSTRACT

A control panel for clothes dryer and clothes dryer. The control panel for clothes dryer includes an operation panel and a mounting panel which can be detachably connected. The operation panel is electrically connected to a control device of the clothes dryer, and is configured to send a control signal to the control device and receive a display signal sent by the control device. The operation panel can be mounted on the mounting panel upwardly or upside down. The mounting panel can be fixedly connected to a housing of a clothes dryer. The clothes dryer includes the housing and the above control panel device. The mounting panel is fixedly connected to a housing of a clothes dryer.

11 Claims, 12 Drawing Sheets

(51) Int. Cl.
*H01F 1/057* (2006.01)
*H01F 1/10* (2006.01)

(56) References Cited

U.S. PATENT DOCUMENTS

| | | | |
|---|---|---|---|
| 8,763,432 B2* | 7/2014 | Yoon | D06F 39/005 |
| | | | 312/228 |
| 9,732,963 B2* | 8/2017 | Kozinski | F24C 3/124 |
| 2009/0153004 A1* | 6/2009 | Han | D06F 39/12 |
| | | | 312/228 |

* cited by examiner

CONTROL PANEL FOR CLOTHES DRYER AND CLOTHES DRYER

This application is a national phase application under 35 U.S.C. § 371 of International Patent Application PCT/CN2014/091304, filed on Nov. 17, 2014, which claims priority to Chinese Patent Application No. 201410512415.7 filed on Sep. 29, 2014, titled "Clothes Dryer Control Panel Device and Clothes Dryer" and applied by QingDao JiaoNan Haier Washing Machine CO., LTD., the entire disclosures of which applications are incorporated herein by reference.

TECHNICAL FIELD

The present disclosure relates to a control panel device for clothes dryer and a clothes dryer provided with the control panel device.

BACKGROUND

Clothes dryer is a commonly used household appliance. In order to operate convenient, the clothes dryer may be placed in upward state or in an upside-down state (a distance between a control panel and the ground can be reduced when the clothes dryer placed on a washing machine or fixedly mounted on a wall is upside down). Once the clothes dryer is disposed upside down, a plate membrane that is attached to the control panel is also upside down, which is inconvenient to the user.

In order to solve this problem, the original plate membrane needs to be removed, and a new plate membrane corresponding to the placement state of the clothes dryer needs to be pasted. Since the plate membrane is fixed by means of a glue, a large area of the glue may be left on the control panel and be removed differently when the plate membrane is removed from the control panel, which results in the problems that a large area of glue is left on the control panel and is difficult to clean, etc. The user will still face the problem when it is required to adjust the placement state of the clothes dryer during being used by the user, even if the manufactured product has not been pasted any plate membrane in advance and the user pastes the plate membrane corresponding to an actual mounting state.

SUMMARY

An object of the present disclosure is to provide a control panel device for a clothes dryer, which is convenient to be mounted and dismounted and does not affect the normal use of the user when the clothes dryer is disposed upside down.

Another object of the present disclosure is to provide a control panel device for a clothes dryer, which is convenient to be mounted and dismounted and has a stable connection mode between an operation panel and a mounting panel.

A further object of the present disclosure is to provide a clothes dryer which is easy to stall and dismount and convenient to use upside down.

In order to achieve the purpose, according to an aspect, the present disclosure employs the following technical solution:

A control panel device for clothes dryer includes an operation panel and a mounting panel which are detachably connected. The operation panel is configured to be electrically connected to a control device of the clothes dryer for transmitting a control signal to the control device and receiving a display signal transmitted by the control device.

The operation panel is capable of being mounted on the mounting panel upwardly or upside down, and the mounting panel is capable of being fixedly connected to a housing of the clothes dryer.

In particular, the mounting panel presents a centrosymmetric structure.

In particular, the electrical connection includes a wired connection or a wireless connection.

In particular, the operation panel and the mounting panel are connected by a screw, a jack catch, a hook and/or a magnetic member.

Further, the magnetic member is made of Neodymium-Iron-Boron magnet steel, ferrite magnet steel and/or Aluminium-Nickel-Cobalt magnetic steel.

In particular, a dismounting and mounting groove is arranged on the operation panel.

In particular, the operation panel and the mounting panel are flush with each other; or, an edge of the operation panel protrudes to form a flanging, which is wrapped around an edge of the mounting panel.

In particular, a plate membrane is provided outside of the operation panel, and a display icon for indicating the meaning of a key or a display lamp is provided on the plate membrane.

In particular, the mounting panel and the housing of the clothes dryer are connected by a fixing screw and/or a buckle.

According to another aspect, the present invention employs the following technical solution:

A clothes dryer includes housing and the control panel device described above. The mounting panel is fixedly connected to the housing of the clothes dryer.

The control panel device for the clothes dryer according to the present disclosure includes the operation panel and the mounting panel both of which can be detachably connected. The operation panel can be mounted on the mounting panel upwardly or upside down, and the mounting panel can be fixedly connected to the housing of the clothes dryer. Then when the clothes dryer needs to be inverted, the operation panel can be mounted upside down conveniently, thereby ensuring the normal use of users.

Since the mounting panel is fixedly connected to the housing of the clothes dryer of the present disclosure, the mounting panel is convenient to use and easy mounting/dismounting, and can be used upside down when the clothes dryer is positioned at a high place.

REFERENCE NUMERALS IN FIGS

1 operation panel; 2 mounting panel; 3 plate membrane; 5 housing of a clothes dryer; 11 screw; 12 jack catch; 13 hook; 14 magnetic member; 16 flanging; 15 dismounting and mounting groove; 21 fixing screw; 22 buckle

DETAILED DESCRIPTION

The technical solution of the present disclosure will be further described below with reference to the accompanying drawings and the specific embodiments.

Preferred Embodiment I

Figure 1:
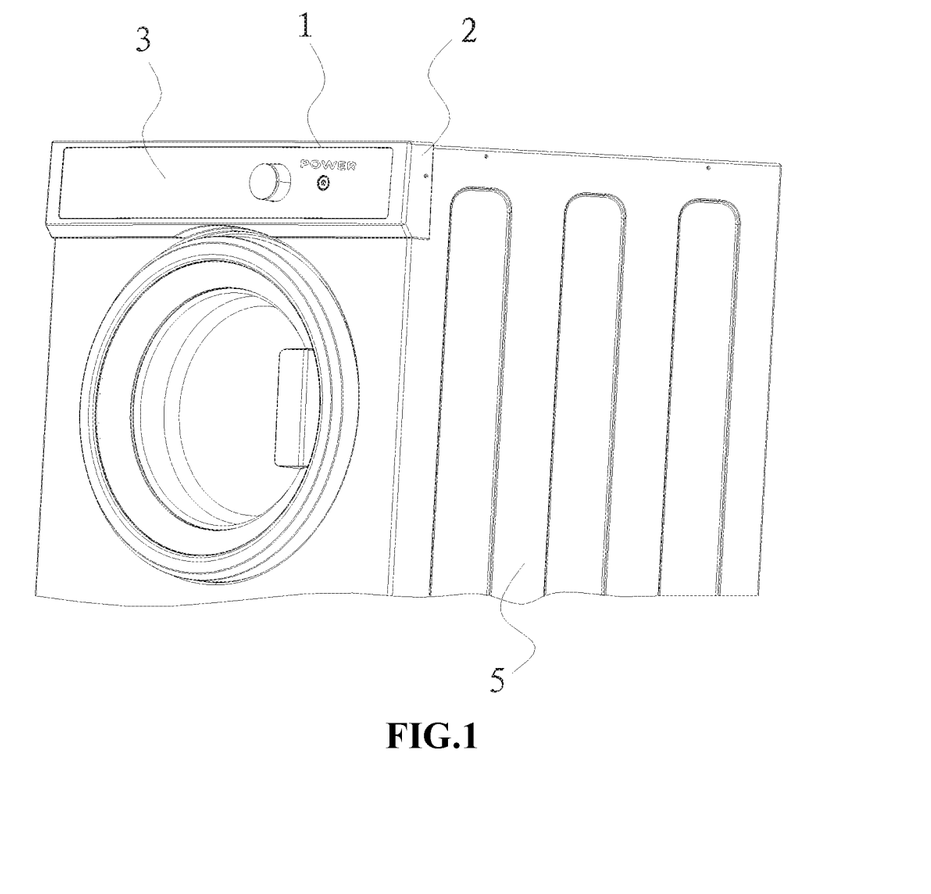
FIG. 1 is a schematic view showing a structure of a clothes dryer in a upward state according to a preferred embodiment I of the present disclosure.
Figure 2:
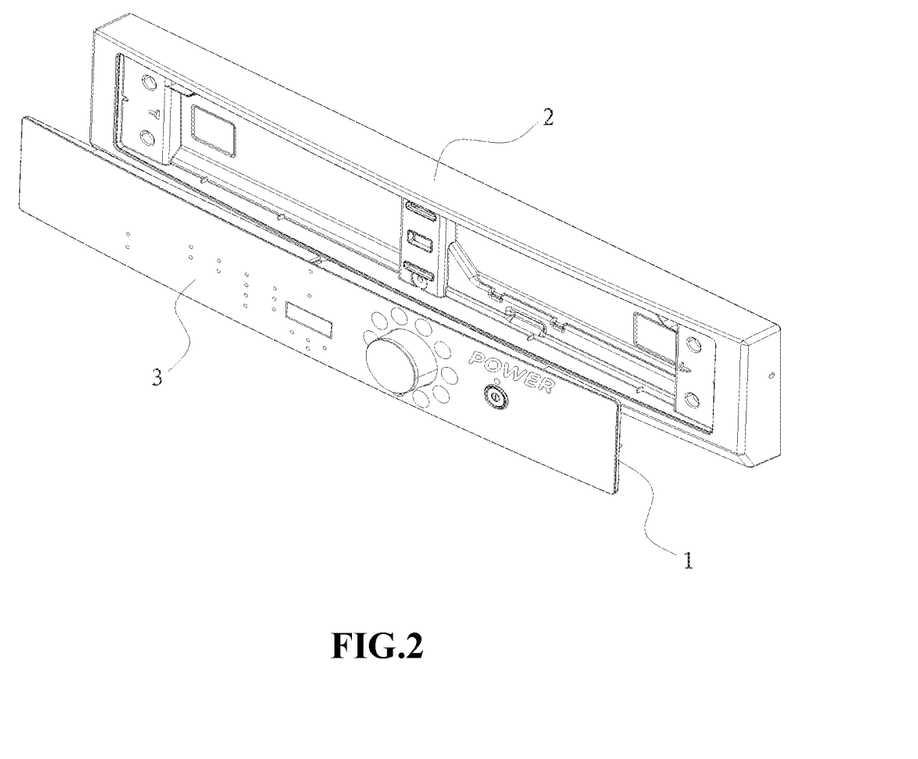
FIG. 2 is a schematic view showing a structure of a control panel device of the clothes dryer in the upward state according to the preferred embodiment I of the present disclosure.

The present preferred embodiment discloses a control panel device for clothes dryer. As shown in FIGS. 1 and 2, the control panel device includes an operation panel 1 and a mounting panel 2 both of which are detachably connected, and a plate membrane 3 disposed outside of the operation panel 1. The plate membrane 3 is provided with a display icon for indicating a meaning of a key or a display lamp. The mounting panel 2 presents a centrosymmetric structure. The operation panel 1 is connected to a control device of the clothes dryer by wirings for transmitting a control signal to the control device and receiving a display signal transmitted from the control device. The operation panel 1 can be mounted on the mounting panel 2 upwardly or upside down and the mounting panel 2 can be fixedly connected to a housing 5 of the clothes dryer.

Figure 3:
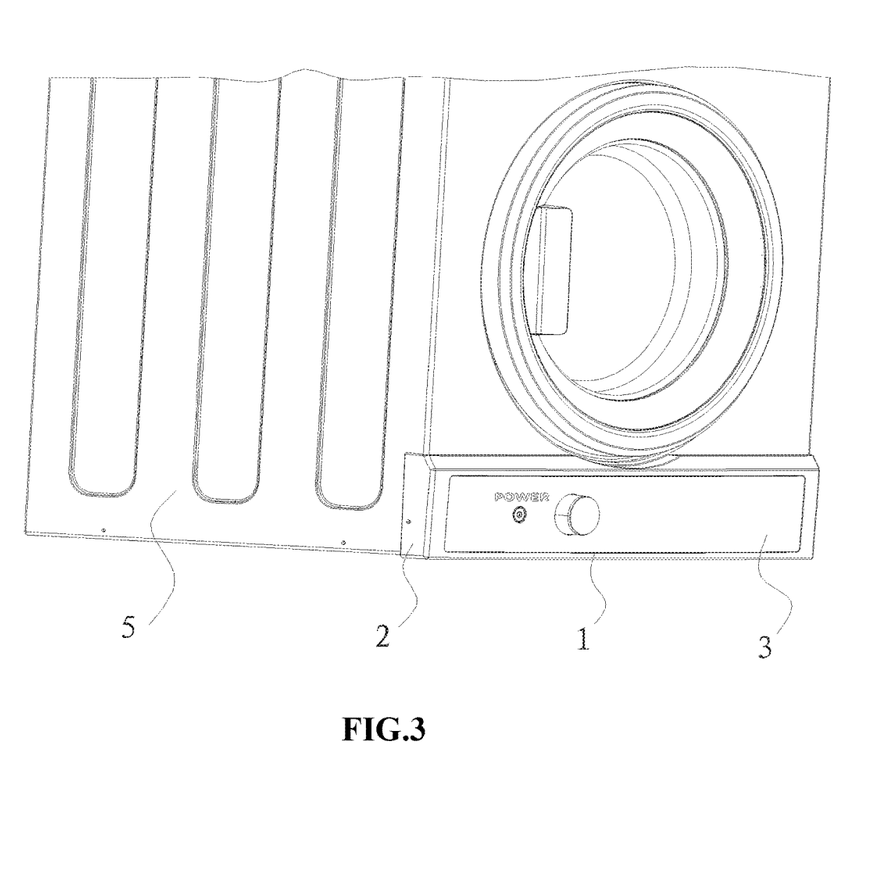
FIG. 3 is a schematic view showing the structure of the clothes dryer in a upside-down state according to the preferred embodiment I of the present disclosure.
Figure 4:
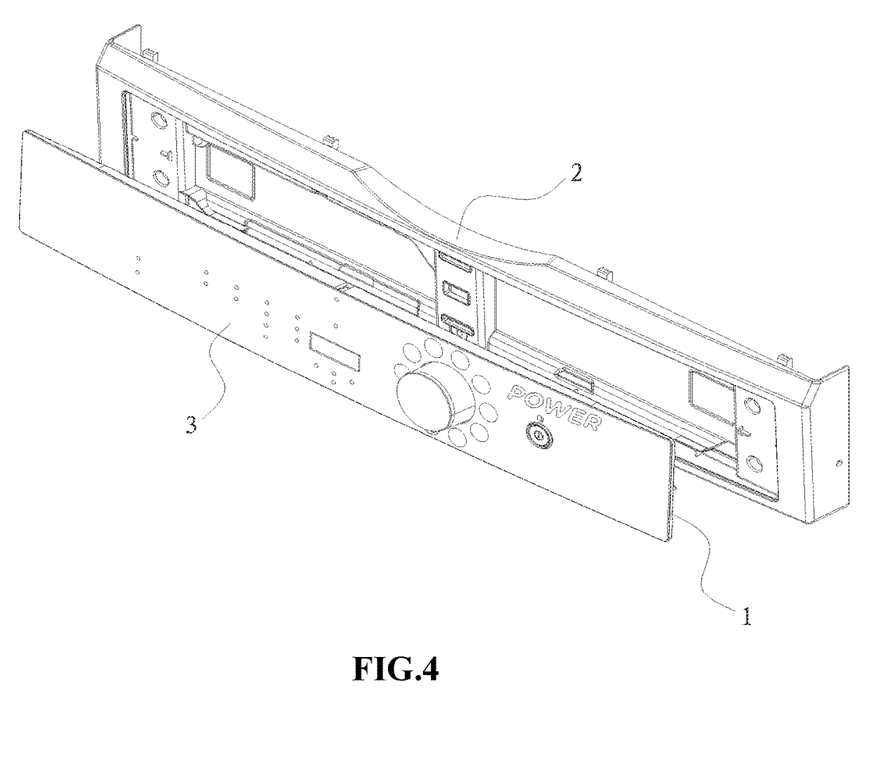
FIG. 4 is a schematic view showing the structure of the control panel device of the clothes dryer in the upside-down state according to the preferred embodiment I of the present disclosure.

When the clothes dryer needs to be disposed upside-down, the operation panel 1 can be conveniently and quickly removed from the mounting panel 2, then turned over and re-mounted, since the operation panel 1 and the mounting panel 2 can be easily dismounted and mounted, and the mounting panel 2 presents the centrosymmetric structure, as shown in FIG. 3 and FIG. 4. Therefore, it is ensured that the display icon is still upward when the clothes dryer is disposed upside down, the convenience and comfort of the usage of the user cannot be affected.

Figure 5:
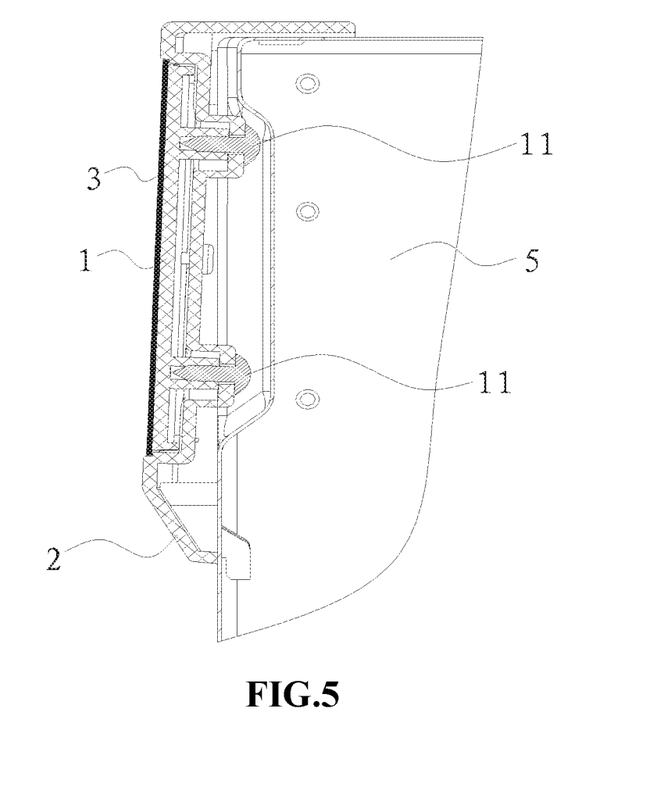
FIG. 5 is a cross-sectional view showing a connection structure of an operation panel and a mounting panel according to the preferred embodiment I of the present disclosure.

As shown in FIG. 5, the operation panel 1 and the mounting panel 2 are connected by a screw 11, so after being mounted, the mounting structure is firm, simple and low cost.

Figure 6:
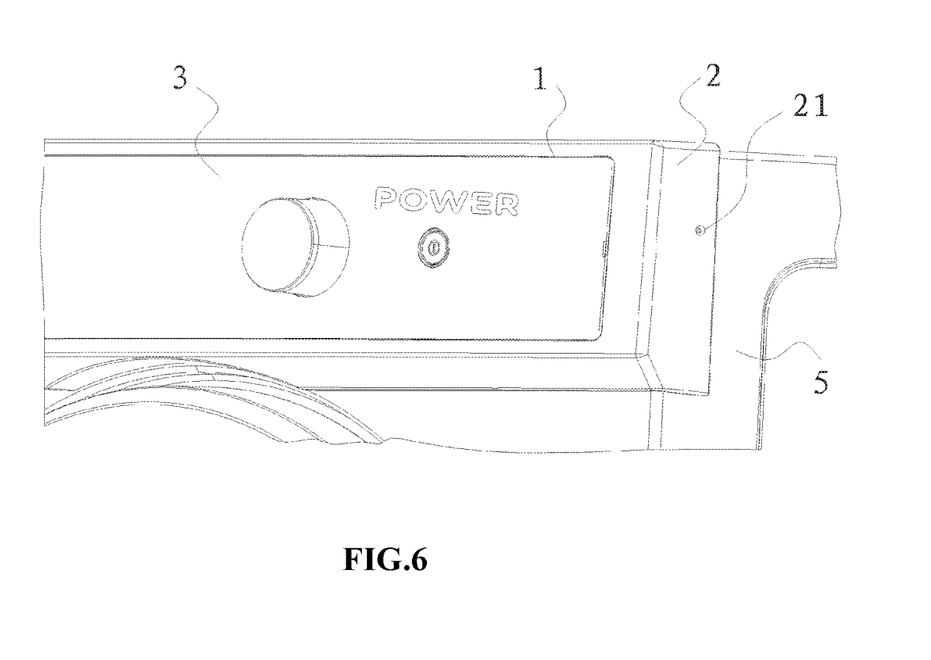
FIG. 6 is a schematic view showing a connection structure of the mounting panel and a housing of the clothes dryer according to the preferred embodiment I of the present disclosure.

As shown in FIG. 6, the mounting panel 2 and the housing 5 of the clothes dryer are connected by a fixing screw 21, thereby being convenient to be dismounted and mounted. The operation panel 1 and the mounting panel 2 are flush with each other for having a good-looking appearance and a convenient machining.

Preferred Embodiment II

The present preferred embodiment discloses a control panel device for clothes dryer, its structure is substantially the same as that of the preferred embodiment I. The control panel device includes an operation panel 1 and a mounting panel 2 both of which are detachably connected. The operation panel 1 is electrically connected to a control device of the clothes dryer for transmitting a control signal to the control device and receiving a display signal transmitted from the control device. The operation panel 1 can be mounted on the mounting panel 2 upwardly or upside down and the mounting panel 2 can be fixedly connected to a housing 5 of the clothes dryer.

The differences lie in that: a display icon for indicating a meaning of a key or a display lamp is directly provided on the operation panel 1, a plate membrane is not required to be provided separately; the specific manner of the electrical connection is not limited, which may be the wired connection or the wireless connection.

Figure 7:
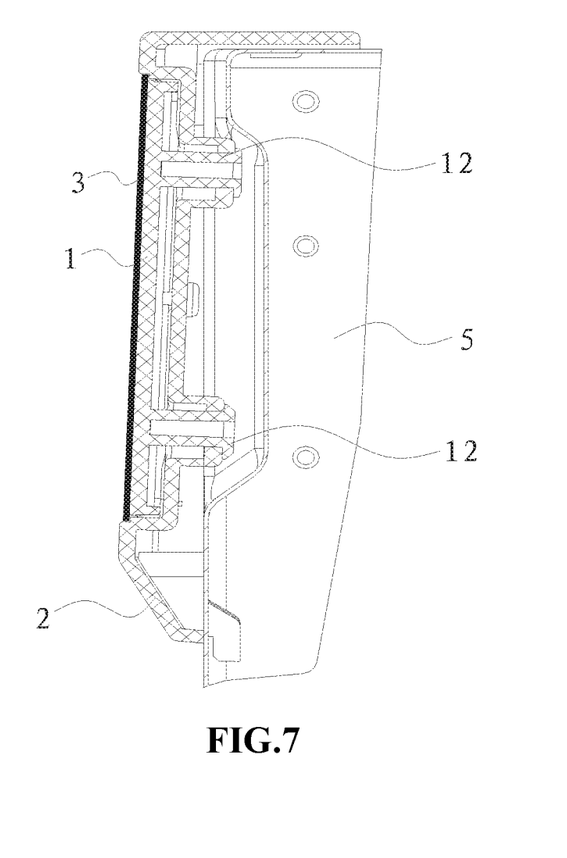
FIGS. 7-10 are cross-sectional views showing a connection structure of an operation panel and a mounting panel according to a preferred embodiment II of the present disclosure.
Figure 8:
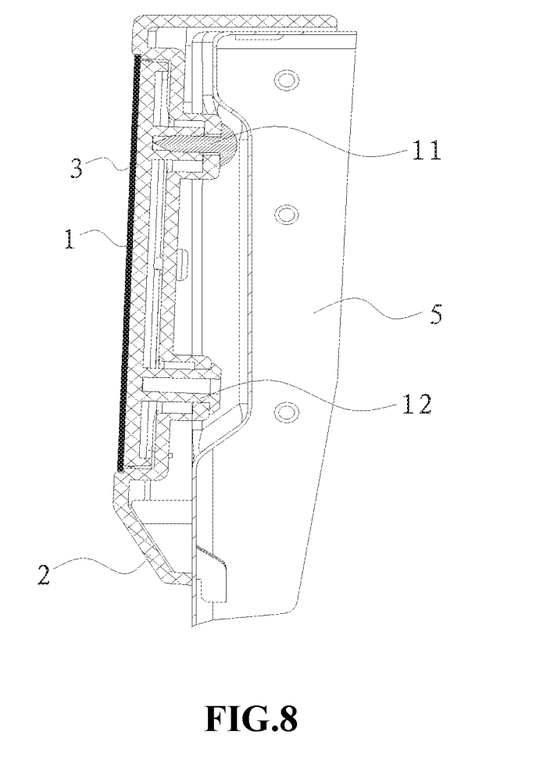
Figure 9:
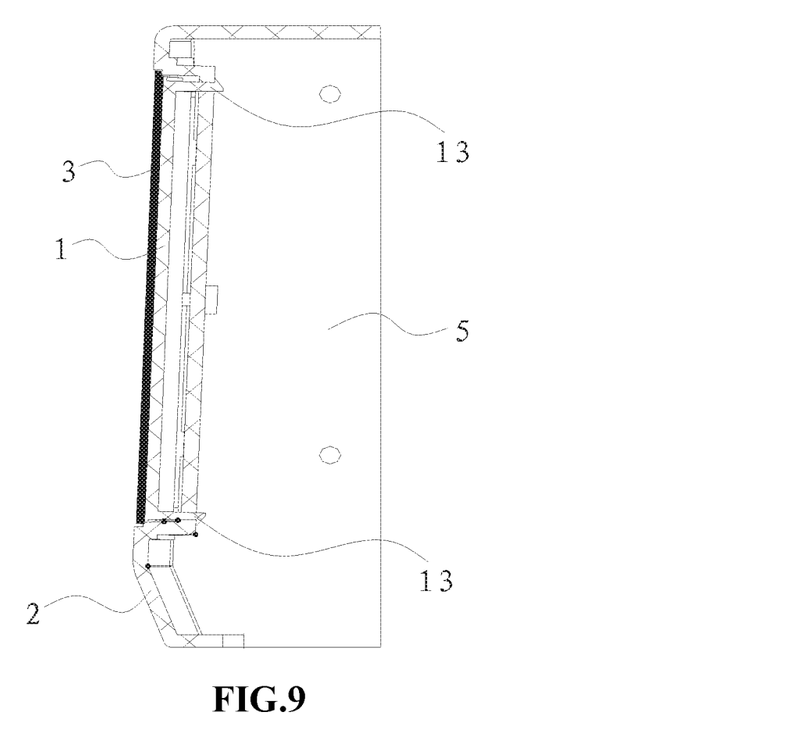
Figure 10:
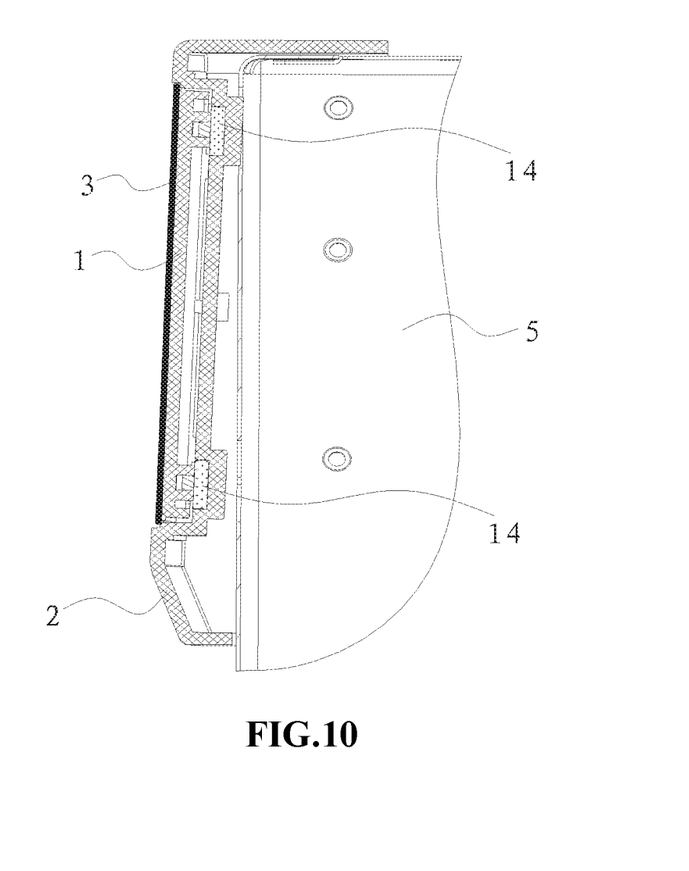

The specific connection mode between the operation panel 1 and the mounting panel 2 is not limited, as long as it can realize a stable and convenient fixed connection between the operation panel 1 and the mounting panel 2. Specifically, as shown in FIG. 7, the operation panel 1 and the mounting panel 2 can be connected to each other by a jack catch 12, which are convenient to be mounted/dismounted. As shown in FIG. 8, the operation panel 1 and the mounting panel 2 are connected by simultaneously using a screw 11 and a jack catch 12, not only ensuring a stability of the mounting but also improving the convenience of the dismounting/mounting. As shown in FIG. 9, the operation panel 1 and the mounting panel 2 can also be connected by a hook 13, which are also to be mounted/dismounted. As shown in FIG. 10, the operation panel 1 and the mounting panel 2 can also be connected by a magnetic member 14.

The material for manufacturing the magnetic member 14 has not being specifically limited. The Neodymium-Iron-Boron magnet steel may be selected when a mounting space is small and a relatively good magnetic force is required. The ferrite magnet steel may be selected when it is required to reduce the cost. The Aluminium-Nickel-Cobalt magnetic steel may be selected when the using environment is complicated and the magnetic member 14 is required to have a good stability.

Figure 11:
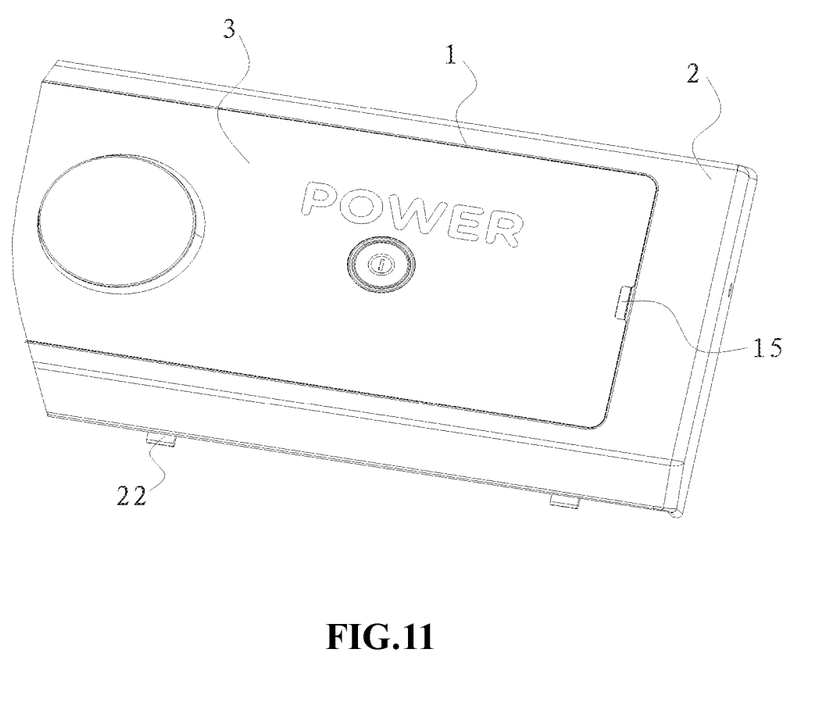
FIG. 11 is a schematic view showing the connection structure of the operation panel and the mounting panel according to the preferred embodiment II of the present disclosure.

As shown in FIG. 11, a dismounting and mounting groove is arranged on the operation panel 1, thereby making the operation panel 1 to be dismounted and mounted conveniently. The mounting panel 2 and the housing 5 of the clothes dryer are connected by a fixing screw 21 and additionally a buckle 22. Thus the buckle 22 can have a pre-fixing function to the mounting panel 2 during being mounted, and can enhance the firmness between the mounting panel 2 and the housing 5 of the clothes dryer after being mounted.

Figure 12:
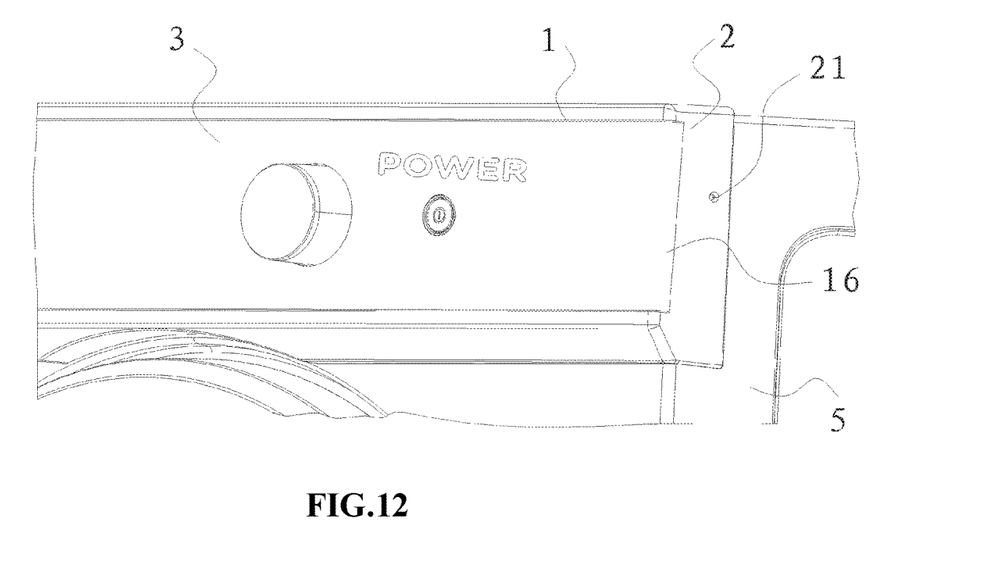
FIG. 12 is a schematic view showing a connection structure of the mounting panel and a housing of the clothes dryer according to the preferred embodiment II of the present disclosure.

As shown in FIG. 12, an edge of the operation panel 1 protrudes to form a flanging 16, which is wrapped around an edge of the mounting panel 2, thereby being convenient to be dismounted and mounted and having a good-looking appearance.

Preferred Example III

The preferred embodiment discloses a clothes dryer, which includes housing and a control panel device as described in preferred embodiment I or II, and the mounting panel is fixed connected to the housing of the clothes dryer.

What is claimed is:

1. A control panel for clothes dryer, comprising:
an operation panel and a mounting panel which are detachably connected;
wherein the operation panel is configured to be electrically connected to a control device of the clothes dryer for transmitting a control signal to the control device and receiving a display signal transmitted by the control device; the operation panel is capable of being mounted on the mounting panel upwardly or upside down and the mounting panel is capable of being fixedly connected to a housing of the clothes dryer.

2. The control panel for clothes dryer according to claim 1, wherein the mounting panel is centrosymmetric in structure.

3. The control panel for clothes dryer according to claim 1, wherein the electrical connection comprises a wired connection or a wireless connection.

4. The control panel for clothes dryer according to claim 1, wherein the operation panel and the mounting panel are connected by at least one of a screw, a jack catch, a hook and a magnetic member.

5. The control panel for clothes dryer according to claim 4, wherein the magnetic member is made of at least one of Neodymium-Iron-Boron magnet steel, ferrite magnet steel and Aluminum-Nickel-Cobalt magnetic steel.

6. The control panel for clothes dryer according to claim 4, wherein a dismounting and mounting groove is arranged on the operation panel.

7. The control panel for clothes dryer according to claim 1, wherein the operation panel and the mounting panel are flush with each other.

8. The control panel for clothes dryer according to claim 1, wherein a plate membrane is provided outside of the operation panel, and a display icon for indicating the meaning of a key or a display lamp is provided on the plate membrane.

9. The control panel for clothes dryer according to claim 1, wherein the mounting panel and the housing of the clothes dryer are connected by at least one of a fixing screw and a buckle.

10. A clothes dryer comprising a housing, wherein further comprising a control panel device according to claim 1, wherein the mounting panel is fixedly connected to the housing of the clothes dryer.

11. The control panel for clothes dryer according to claim 1, wherein an edge of the operation panel protrudes to form a flanging, which is wrapped around an edge of the mounting panel.

* * * * *